United States Patent
Enenkiel

(10) Patent No.: US 9,083,711 B2
(45) Date of Patent: Jul. 14, 2015

(54) SERVER COMPUTER, CLIENT DEVICE, AND WEB-SERVICE-IMPLEMENTED DATA PROCESSING METHOD

(75) Inventor: Achim Enenkiel, Karlsruhe (DE)

(73) Assignee: SAP SE, Walldorf (DE)

(*) Notice: Subject to any disclaimer, the term of this patent is extended or adjusted under 35 U.S.C. 154(b) by 1439 days.

(21) Appl. No.: 11/493,630

(22) Filed: Jul. 27, 2006

(65) Prior Publication Data

US 2007/0078860 A1   Apr. 5, 2007

(30) Foreign Application Priority Data

Jul. 27, 2005  (EP) ................................. 05106925

(51) Int. Cl.
 *G06F 15/16* (2006.01)
 *H04L 29/08* (2006.01)

(52) U.S. Cl.
 CPC ............ *H04L 67/1008* (2013.01); *H04L 67/02* (2013.01); *H04L 67/1002* (2013.01); *H04L 67/1017* (2013.01); *H04L 67/1021* (2013.01); *H04L 67/1036* (2013.01); *H04L 67/18* (2013.01); *H04L 67/327* (2013.01)

(58) Field of Classification Search
 CPC ....... H04L 45/42; H04L 45/30; H04L 45/306; H04L 45/308; H04W 4/02; H04W 4/021; H04W 4/025
 USPC ..................................... 709/217, 223; 707/10
 See application file for complete search history.

(56) References Cited

U.S. PATENT DOCUMENTS

| | | | |
|---|---|---|---|
| 6,078,960 A * | 6/2000 | Ballard ........................ | 709/229 |
| 6,317,786 B1 | 11/2001 | Yamane et al. | |
| 6,327,622 B1 | 12/2001 | Jindal et al. | |
| 7,233,830 B1 * | 6/2007 | Callaghan et al. ................. | 700/9 |
| 2002/0194342 A1 * | 12/2002 | Lu et al. ......................... | 709/227 |
| 2003/0018661 A1 | 1/2003 | Darugar | |
| 2003/0055624 A1 | 3/2003 | Fletcher et al. | |
| 2003/0055868 A1 | 3/2003 | Fletcher et al. | |

(Continued)

FOREIGN PATENT DOCUMENTS

| EP | 1 307 018 A1 | 5/2003 |
|---|---|---|
| WO | WO 2005/060203 A1 | 6/2005 |

OTHER PUBLICATIONS

Yoshikawa et al., "Using Smart Clients to Build Scalable Services," Proceedings of the Usenix Annual Technical Conference, 1997.*
Cheng et al., "A New Framework for Mobile Web Services," Applications and the Internet (Saint) Workshops, 2002, pp. 218-222.

(Continued)

*Primary Examiner* — Sulaiman Nooristany
(74) *Attorney, Agent, or Firm* — Gerard M. Wissing; Dilworth IP, LLC

(57) ABSTRACT

A data processing system includes a server computer and at least one client device. The server computer includes means for providing a central web service, the central web service having a central web service address. An interface means receives a web service request addressed to the central web service address from the client device and forwards the web service request to one of a plurality of alternative web services selected by the central web service. The client device includes means for storing the central web service address and means for generating the web service request. An interface means at the client sends the web service request to the central web service address, and receives a web service response from the one of the plurality of alternative web services selected by the central web service.

9 Claims, 6 Drawing Sheets

(56) References Cited

U.S. PATENT DOCUMENTS

| | | | |
|---|---|---|---|
| 2003/0093436 A1 | 5/2003 | Brown et al. | |
| 2003/0110242 A1 | 6/2003 | Brown et al. | |
| 2003/0163513 A1 | 8/2003 | Schaeck et al. | |
| 2003/0187841 A1 | 10/2003 | Zhang et al. | |
| 2003/0225894 A1* | 12/2003 | Ito | 709/227 |
| 2004/0003130 A1 | 1/2004 | Becker et al. | |
| 2004/0045005 A1 | 3/2004 | Karakashian | |
| 2004/0064503 A1 | 4/2004 | Karakashian et al. | |
| 2004/0139049 A1* | 7/2004 | Hancock et al. | 707/1 |
| 2005/0177401 A1* | 8/2005 | Koeppel et al. | 705/4 |
| 2006/0129665 A1* | 6/2006 | Toebes et al. | 709/223 |

OTHER PUBLICATIONS

Hansen et al., "Web Services: An Architectural Overview," Internet Citation, 2002, pp. 1-14.

Yoshikawa et al., "Using Smart Clients to Build Scalable Services," Proceedings of the Usenix Annual Technical Conference, 1997, pp. 105-117.

Hung et al., "Mobile Distributed Web Server System," Cyber Worlds Proceedings, First International Symposium, 2002, pp. 346-353.

Crovella et al., "Dynamic Server Selection in the Internet," Conference Proceedings Article, 1995, pp. 158-162.

European Search Report and Communication for EP 05106925.0, dated Mar. 20, 2006 (13 pages).

* cited by examiner

SERVER COMPUTER, CLIENT DEVICE, AND WEB-SERVICE-IMPLEMENTED DATA PROCESSING METHOD

CROSS-REFERENCE TO RELATED APPLICATION

This application is based upon and claims the benefit of priority from European (EP) Patent Application No. 05106925.0, filed Jul. 27, 2005, the entire contents of which are expressly incorporated herein by reference.

DESCRIPTION

1. Technical Field

The present invention relates generally to systems and methods for data processing. More particularly, the invention relates to web services.

2. Background Information

Web services are an emerging technology that offers the dual promise of simplicity and pervasiveness. Web services represent the next level of function and efficiency in e-business. A web service can be viewed as any system by which an application or data processing service can be provided to other applications on the Internet.

Web services may be informational or transactional. That is, some services provide information of interest to the requestor while other services may actually lead to the invocation of business procedures. Examples of publicly available web services today include stock quote services, services to retrieve news from web news sources, and currency conversion services. For example, U.S. Pat. No. 6,604,135 discloses a method and system for location-based web services.

One example of web services are the services responsive to simple object access protocol (SOAP) messages. SOAP is an application invocation protocol that defines a protocol for exchanging information encoded as XML messages. Normally these services are described by WSDL (Web Service Description Language) notation stored in WSDL documents.

A WSDL document can be stored in numerous ways, such as in a file, in a DB2 XML registry/repository, or in a DB2 based UDDI registry. UDDI (Universal Description, Discovery, Integration) is a protocol for describing web services such that interested parties may easily discover them. Service providers may register their services in a UDDI, specifying technical information about how to invoke the services. Often a WSDL document is stored in a UDDI registry in order to define the messages that a particular web service accepts and generates.

The design of UDDI allows enterprises that own web-service-enabled applications to publish data about themselves and their services. By providing this information, UDDI implements a simplified form of searching for those interested in locating a particular service in which to fulfill an application process. The conventional UDDI search is focused on single search criteria, such as business name, business location, business categories, business identifier, service type by name, and discovery URL (Uniform Resource Locator).

Various approaches for implementing web services are described in U.S. Patent Application Nos. 2003/0093436A1, 2003/0055868A1, 2003/0055624A1, 2003/0018661, 2003/0110242, 2003/0163513A1, 2004/0064503A1, 2004/0045005A1, 2004/0003130A1, and 2003/0187841A1.

SUMMARY

In an embodiment consistent with the invention, a server computer comprises means for providing a central web service. The central web service includes a central web service address, an interface means for receiving a web service request addressed to the central web service address and for forwarding the web service request to one of a plurality of alternative web services. The central web service may select the one of the plurality of alternative web services.

For example, the central web service may act as a receiver for web service requests from a plurality of client devices. In this respect, the central web service can serve as a central "hub" for receiving and forwarding the web service requests. The central web service may use a selection criterion to select one of a plurality of alternative web services for processing a given web service request received from one of the client devices.

The client devices may only require the address of the central web service, but not the addresses of the alternative web services. Central storage of the addresses of the alternative web services and of the selection logic facilitates maintenance. When alternative web services are added, deleted, or when addresses of alternative web services change, the respective information can be updated on the server computer but not on the client devices. Further, if the selection logic changes (e.g., if a selection criterion or a selection rule changes), the selection logic can be updated centrally on the server computer.

For example, application programs implemented on the client devices may require one or more web services. The application programs may only require a single central web service address for each required service as a common point of reference. If the selection logic for selection of alternative web services, web service addresses, or other parameters change, this does not need to be reflected on the individual client devices.

In an embodiment consistent with the invention, the central web service selects one of the alternative web services for processing a web service request received from one of the client devices for load balancing. For example, the central web service assigns web service requests to the available alternative web services in a round-robin manner such that the average number of web service requests to be processed by each of the alternative web services per time unit is about equal.

In an embodiment consistent with the invention, the web service requests contain location information indicative of a geographic location of the client device from which the respective web service request originates. For example, the client device can be a wireless mobile communication device, such as a mobile computer, smartphone, personal digital assistant, or a similar portable or handheld electronic appliance. The client device can have integrated means for determining a current geographic location of the client device, such as by means of a global positioning system (GPS) or by using a cellular communication network, such as a cell identifier, triangulation techniques, or similar techniques.

The central web service can use the location information for the selection of one of the alternative web services. For example, the web service request received from the client device can be location-specific. For example, a user of the client device requests local news or a local weather report by means of the web service request. In this instance, the central web service selects one of the alternative web services that is in proximity to the requesting client device.

Alternatively, a user may request the delivery of a product by means of the web service request. For instance, the web service request may be forwarded to a web service that is in the proximity of the requesting client device, as this can facilitate the supply chain management for delivery of the product.

In another embodiment, the user may request traffic information by means of the web service request. For example, the central web service may select one of the alternative web services using the location information in order to forward the web service request to an appropriate web service that can deliver traffic information that is relevant to the present location of the user device.

In another embodiment consistent with the invention, the web service request may include a user identifier. The central web service performs a selection of one of the alternative web services by means of the user identifier for selection of a user-specific web service. For example, the registered users are grouped into several user groups whereby each user group is assigned to one of the alternative web services. This can be done for the purpose of load balancing or to provide user group specific variations of the web service.

In yet another embodiment consistent with the invention, the web service request may include a tax number. The central web service may serve as a single reception point for receiving electronic tax declarations or other tax-related notifications or submissions. Each of the alternative web services belongs to a local tax office. Based on the tax number, the central web service determines a local tax office for receiving and processing the tax declaration and thus the web service that is assigned to that local tax office. This may facilitate the filing of electronic tax declarations and the distributed processing of such tax declarations by local tax offices.

In an embodiment consistent with the invention, the web service request carries location information for determination of location-dependent tax rates.

In another embodiment, a data processing method comprises providing a central web service that has a central web service address. A web service request, addressed to the central web service address, is received. One of a plurality of alternative web services is selected by means of a predefined selection criterion. The web service request is forwarded to the selected one of the plurality of alternative web services.

In yet another embodiment, a client device includes means for storing a central web service address, means for generating a web service request, and interface means for sending the web service request to the central web service address, and for receiving a web service response from one of a plurality of alternative web services selected by the central web service.

For example, each client device may store the same central web service address for a given web service. This may facilitate implementation and maintenance of application programs that use such a web service. When the web service that is used for processing a client device's web service request is changed, or if the web service's address is changed, this does not require any change on the basis of the client device or its application program as such changes are dealt with by the central web service that maintains the alternative web services' addresses.

In an embodiment consistent with the invention, the client device has means for determining whether the central web service is available or not. If the central web service is unavailable, such as because of a server outage, the client device performs the selection of the web service. For this purpose, the client device has a local storage for storage of the alternative web services' addresses.

In another embodiment consistent with the invention, the determination of whether the central web service is available or not is made using a time-out criterion. For example, if the client device has not received an acknowledge or a response to its web service request that it has sent to the central web service within a predefined time interval, the time-out criterion is met and the central web service is considered unavailable by the client device. In response, the client device performs a selection of one of the alternative web services locally using its list of alternative web service addresses.

In an embodiment consistent with the invention, the client device has location-determination means, such as a GPS receiver and/or an interface to a wireless cellular communication network that provides the location information. For example, the location information indicates a current geographic position of the client device. The location information is communicated from the client device to the central web service together with the web service request. The location information is used by the central web service for selection of one of the alternative web services. For example, the central web service selects one of the web services that is closest to the current geographic position of the client device or that provides a local version of the requested web service.

In another embodiment, a computer-readable medium comprises programmable instructions adapted to perform a method of data processing. The method comprises providing a central web service, the central web service having a central web service address. A web service request, addressed to the central web service address, is received. One of a plurality of alternative web services is selected by means of a predefined selection criterion. The web service request is forwarded to the selected one of the plurality of alternative web services.

BRIEF DESCRIPTION OF THE DRAWINGS

The accompanying drawings, which are incorporated in and constitute a part of this specification, illustrate embodiments consistent with the invention and, together with the description, serve to explain the principles of the invention. In the drawings.

DESCRIPTION OF THE EMBODIMENTS

Figure 1:
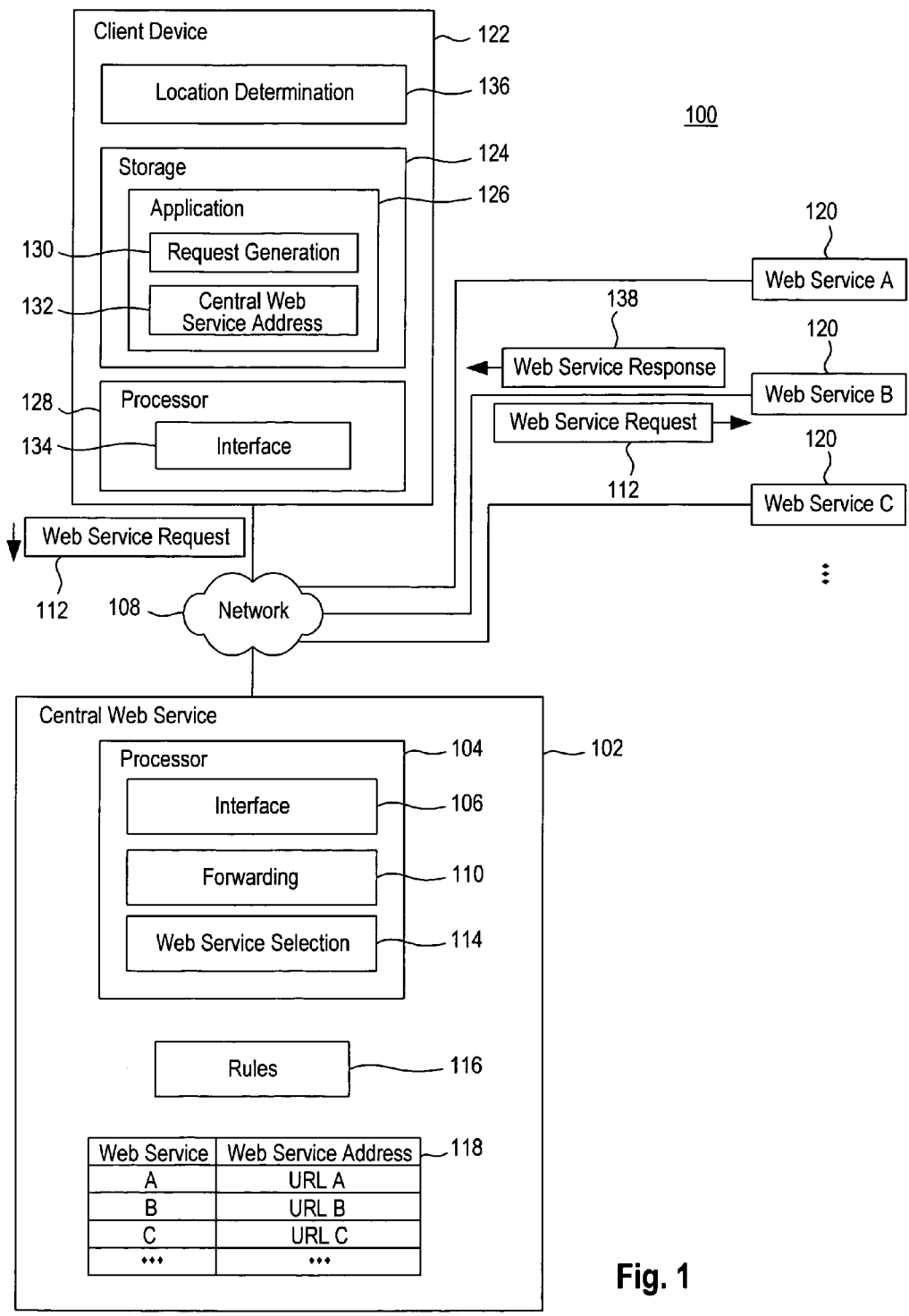
FIG. 1 is a block diagram of an exemplary data processing system, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 shows an exemplary distributed data processing system 100 that has a server computer 102 for providing a central web service, consistent with an embodiment of the present invention. Server computer 102 has at least one processor 104 for providing an interface 106 to a network 108. Network 108 can be a telecommunication and/or computer network, such as the Internet.

Processor 104 can execute a program component 110 to forward a web service request 112 received by the central web service to a selected alternative web service 120, such as one or more of exemplary alternative web services shown in FIG. 1 and labelled as alternative web service A, alternative web service B, and alternative web service C.

Further, processor 104 may execute a program component 114 that selects one of alternative web services 120. Program component 114 may use selection rules 116 of the central web service to select one of alternative web services 120. Selection rules 116 can implement a load-balancing criterion for selection of one of alternative web services 120 for processing web service request 112 such that the processing load of alternative web services 120 is balanced. This can be accomplished by a suitable arbitration scheme, such as round-robin arbitration.

For example, when server computer 102 receives a sequence of web service requests 112 via network 108, a first web service request of the sequence is assigned to alternative web service A, a second web service request of the sequence is assigned to alternative web service B, a third web service request of the sequence is assigned to alternative web service C, a fourth web service request of the sequence is assigned to alternative web service A, a fifth web service of the sequence is assigned to alternative web service B, and so forth, assuming that there are three alternative web services A, B, and C. Assuming that all of web service requests 112 require approximately the same data processing resources, the loading of alternative web services 120 can thus be balanced.

In addition, web service requests 112 can have assigned priorities. For example, there may be three different priorities. Web service requests having a highest priority may be assigned to alternative web service A, web service requests having a second-highest priority may be assigned to alternative web service B, and lowest priority web service requests may be assigned to alternative web service C. Further, arbitration of web services requests 112 having the same priority can be performed by means of a round-robin arbitration scheme or another arbitration scheme.

Alternatively or in addition, each of web service requests 112 can carry location information. For example, the location information may identify the current geographic location of an originating client device from which web service request 112 has been sent to the central web service. The selection of one of alternative web services 120 may be performed by program component 114 using location information by applying selection rules 116. Selection rules 116 may contain a location criterion. For example, alternative web service A may be assigned to a first geographical region, alternative web service B may be assigned to a second geographical region, and alternative web service C may be assigned to a third geographical region.

When the location information of web service request 112 indicates that web service request 112 has been received from a client device that is currently located in the first geographic region, alternative web service A is selected. Similarly, if web service request 112 is received from a client device that is located in the second geographic region, alternative web service B is selected, and, if web service request 112 is received from the third geographic region, alternative web service C is selected.

This is particularly useful if alternative web services 120 are location-specific variants of the same web service. For example, the web service provided by alternative web services 120 may be weather forecast information, local news, or other information that is location-specific.

Alternatively or in addition, a web service request 112 received by server computer 102 via network 108 may contain a user identifier. The user identifier can be used to identify an individual, an organizational entity, a company, and/or a machine user. In one embodiment, program component 114 may use the user identifier to select one of alternative web services 120 by applying selection rules 116 that include a user-identifier-specific selection criterion.

For example, selection rules 116 define three disjunct groups of users by means of the respective user identifiers. The first group of users is assigned to web service A, the second group of users is assigned to web service B, and the third group of users is assigned to web service C.

When server computer 102 receives web service request 112 with a user identifier, program component 114 applies selection rules 116 to determine a group of users to which the user identifier received with web service request 112 belongs and, thus, which of alternative web services 120 will process web service request 112. For example, if the user identifier of web service request 112 identifies the originating user of web service request 112 as a member of the first group of users, alternative web service A may be selected. Similarly, if the user identifier identifies web service request 112 as originating from a user of the second user group, alternative web service B may be selected for processing of web service request 112.

For example, the user identifier can be a tax number. In this case, web service request 112 contains tax-related information, such as a tax declaration of an individual or a company, and the web service request may thus be directed to the filing of a tax declaration. In this example, alternative web service A is provided by a local tax office that processes tax declarations of individuals and/or companies that have their place of residence or place of business, respectively, in a first geographic region. Similarly, alternative web service B is provided by a local tax authority for a second geographic region, and alternative web service C is provided by a local tax authority for a third geographic region. Selection rules 116 can be implemented as a mapping table that assigns each tax number to one of alternative web services 120. When web service request 112 is received and contains a tax declaration and a tax number, program component 114 may use the mapping table that implements selection rules 116 to determine which one of alternative web services 120 will process that tax declaration.

In one implementation, after selecting one of alternative web services 120, program component 110 may forward web service request 112 to the web service address of the selected alternative web service, as indicated by a table 118 stored on server computer 102. Alternative web services 120 coupled to network 108 may provide the same or substantially the same web service, such as location-specific variants of the same web service. Further, a plurality of client devices 122 can be coupled to the central web service via network 108. In the following, one of client devices 122 is considered by way of example.

Client device 122 has a storage 124 for storing an application program 126 that contains computer-executable instructions to be executed by at least one processor 128 of client device 122. Application program 126 comprises a program module 130 for generating web service request 112 and the central web service address, shown as central web service address 132, of central web service 102. Processor 128 provides an interface 134 for sending web service request 112 to the central web service via network 108.

As an option, client device 122 comprises a location-determination module 136 for determining a current geographic location of client device 122. For example, location-determination module 136 can be implemented by means of GPS (global positioning system) and/or by location-determination services provided by a cellular telecommunication network, when client device 122 is a mobile telephone, or another portable wireless device.

Application program 126 can invoke program module 130 for generating web service request 112 and reading central web service address 132 to which web service request 112 is to be directed. Program module 130 can access location-determination module 136 for inclusion of location information in web service request 112. Alternatively or in addition, other information can be included in web service request 112, such as a priority of the request, a user identifier, and/or other information. For example, application program 126 may be an enterprise resource planning program or an application program that includes a module for automatically generating tax declarations.

In one embodiment, when the central web service receives web service request 112, program component 114 selects one of the alternative web services 120. Program component 114 may use selection rules 116 by applying the respective selection criterion on the information contained in web service request 112. After selection of one of alternative web services 120, the selected alternative web service's address is determined by accessing table 118 via program component 114. Further, program component 110 is invoked in order to forward web service request 112 to selected web service 120, which is alternative web service B in the example considered in FIG. 1. Selected alternative web service B receives forwarded web service request 112 via network 108. In response, alternative web service B processes web service request 112 and generates a respective web service response 138. Web service response 138 is transmitted to client device 122 via network 108 for further processing by application program 126.

All client devices 122 may use the same central web service address 132 as the selection of the alternative web service 120 that processes web service request 112 is performed by the central web service. In one implementation, application program 126 does not need to be changed if one or more of the web service addresses of the alternative web services 120 is changed and/or if the selection rules are modified. As a consequence, frequent updates of application program 126 can be avoided.

Alternatively, the client device may be an automation component of an industrial control system. In this instance, application program 126 implements a control function that requires a web service, such as for obtaining a control parameter.

As another alternative, the client device may be a car-navigation system. The car-navigation system may include a user interface that enables a user to invoke program module 130 in order to generate a web service request 112 (e.g., for requesting a hotel reservation for a hotel that is in the proximity of the target address of the navigation). Web service request 112 may include the target address and/or the geographical coordinates of the target address. The central web service may select one of alternative web services 120 that covers a region containing the target address as far as hotel reservations are concerned.

Selected web service 120 may return a web service response 138 that contains a suggestion for a hotel reservation or a list of such suggestions. In addition, web service response 138 may contain the hotel address and/or the geographical coordinates of each suggested hotel in a format that can be automatically imported into the navigation system.

If the user enters an acceptance of one of the suggested hotel reservations, the hotel address and/or the geographical coordinates of the hotel may be automatically imported into the address book of the car-navigation system. At the user's option, the navigation is continued into the direction of the original target address or the target of the navigation is changed to the hotel address. If the car-navigation system does not receive web service response 138 within a predefined period of time, it may use hotel information stored on a local data carrier, such as a CD-ROM or DVD that also contains the road-map information that forms the basis for the navigation.

The same procedure can be used with respect to other points of interest that are in the proximity of the target address or in the proximity of the current location of the car. In the latter case, web service request 112 contains the current geographical location or address of the car rather than the target address of the navigation.

Figure 2:
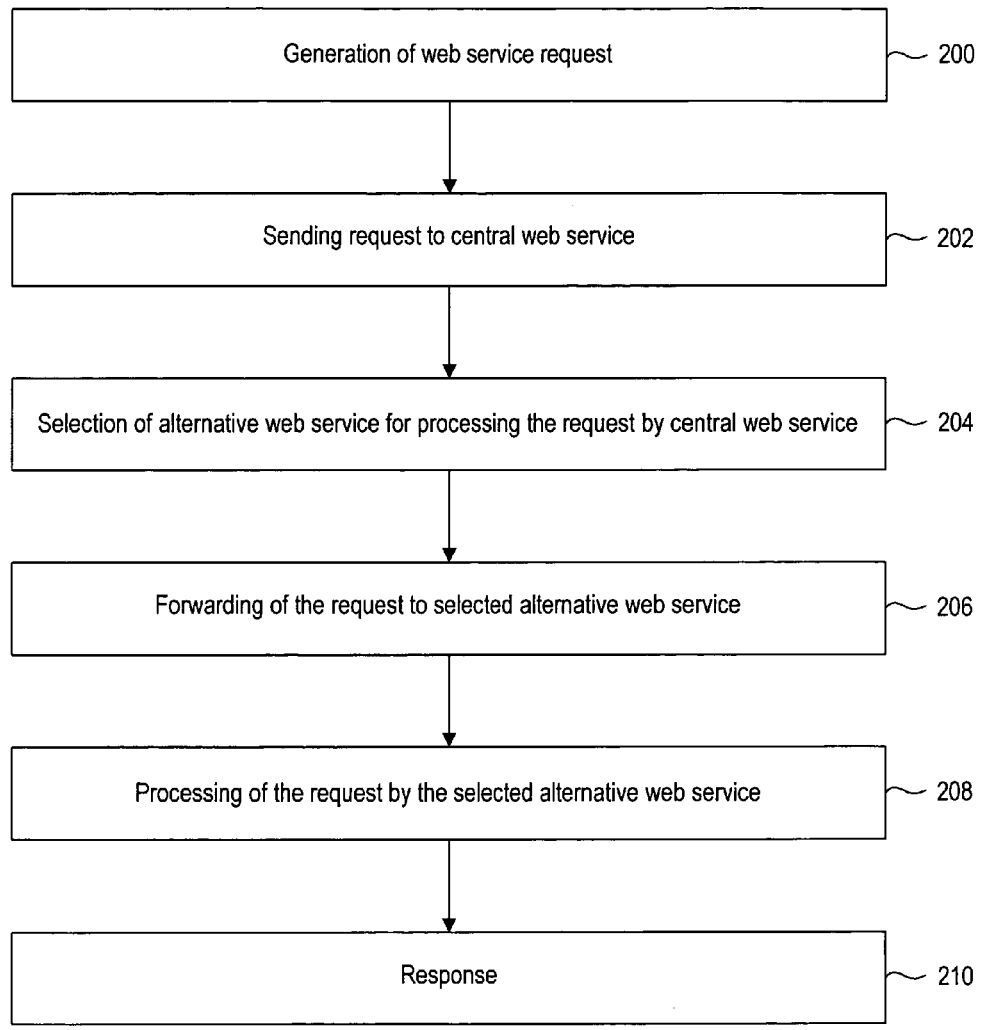
FIG. 2 is a flowchart of an exemplary method, consistent with an embodiment of the present invention.

FIG. 2 is a flowchart of an exemplary method, consistent with an embodiment of the present invention. In step 200, a web service request is generated by one of the client devices. The web service request is sent to the central web service in step 202.

In step 204, the central web service selects one of the alternative web services for processing of the received web service request. The selection of one of the alternative web services may be performed by application of one or more predefined selection criteria, such as location-specific, priority-specific, and/or user-specific selection criteria.

In step 206, the web service request is forwarded to the selected alternative web service. Next, in step 208, in response, the alternative web service performs a processing step to generate a response. In step 210, the response to the web service request is sent back to the requesting client device.

Figure 3:
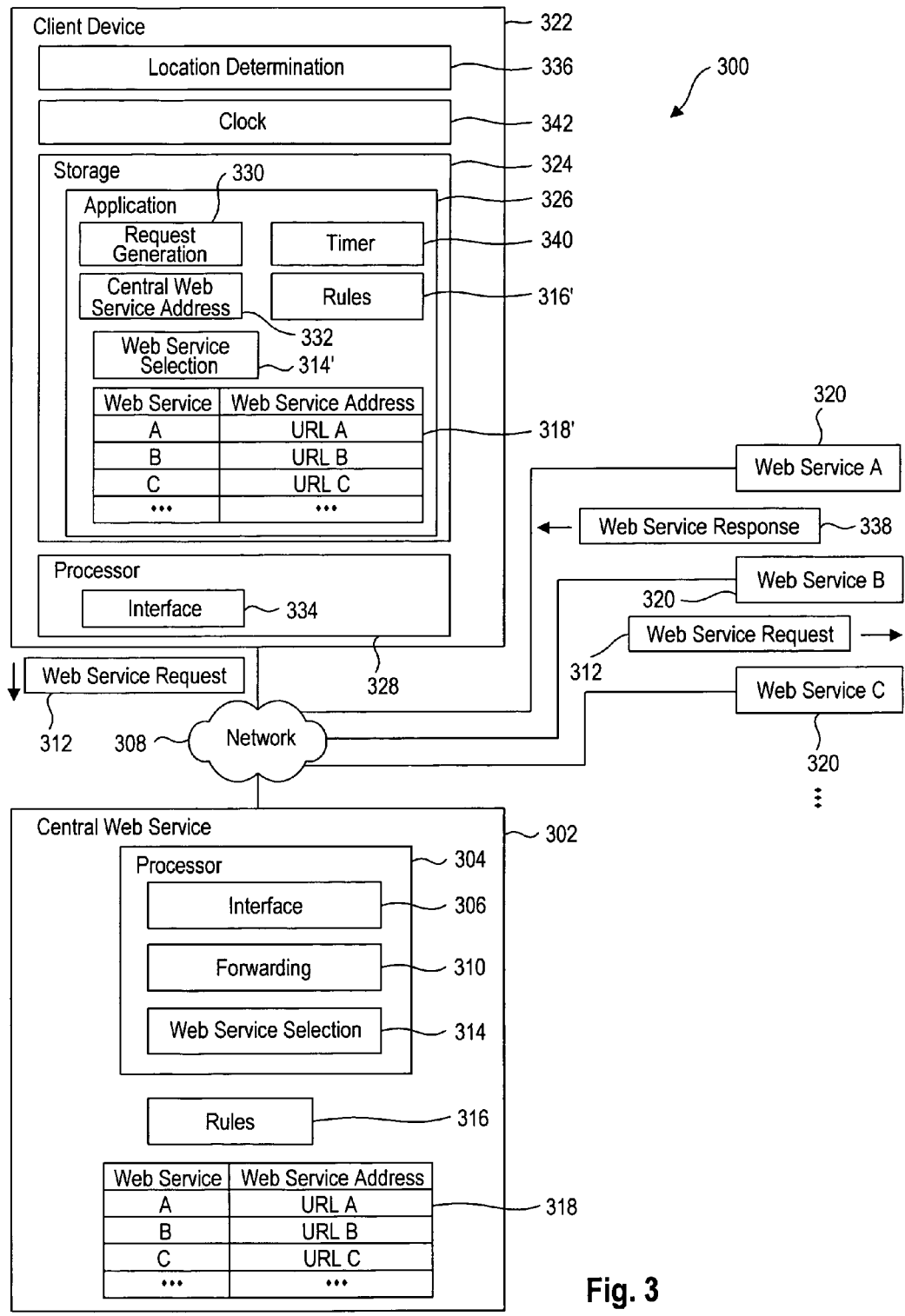
FIG. 3 is a block diagram of an exemplary data processing system, consistent with an embodiment of the present invention.

FIG. 3 is a block diagram of an exemplary data processing system, consistent with an embodiment of the present invention. Elements of FIG. 3 that correspond to elements of the embodiment of FIG. 1 are designated by reference numerals having the same last two digits.

Client device 322 stores a table 318' that is a local copy of table 318 stored on server computer 302 that provides the central web service. Table 318' can form an integral part of application program 326'. In addition, application program 326' can contain a program component 314' that is a local copy of respective program component 314 of server computer 302. Similarly, application program 326 comprises selection rules 316' that are a local copy of selection rules 316 used by server computer 302.

In addition, application program 326 includes a program component 340 for determining if a time-out condition with respect to the processing of web service request 312 is met. Program component 340 may be implemented as a timer that uses a system clock 342 of client device 322 for determining if the time-out condition is met or not.

In one implementation, client device 322 may generate web service request 312 analogously to the embodiment of FIG. 1 by sending web service request 312 to central web service address 332. In addition, program component 340 is invoked when web service request 312 has been sent to the central web service.

If web service response 338 is received by client device 322 before the time-out condition has been met, program component 314' is not invoked. If, however, no web service response 338 is received within the time limit set by program component 340, program component 340 invokes program component 314' for local selection of the alternative web service by client device 322 itself using table 318' and rules 316'. Web service request 312 is then resent directly to the alternative web service selected by program component 314'.

In the following manner, a two stage mechanism is provided for failure protection:

The first stage is constituted by server computer 302. If server computer 302 becomes unavailable due to a server outage, client device 322 will not receive a response to its web service request 312. If the respective time-out condition is met, the second stage is invoked.

The second stage for failure protection is constituted by the local selection logic for selection of one of the alternative web services implemented in application program 326. If server computer 302 goes down, it cannot provide access to one of the alternative web services. In this case, afflicted client device 322 autonomously determines one of the alternative web services and resends its web service request 312 to the locally selected alternative web service.

In order to limit the administrative overhead for maintaining the local copies of program component 314', selection rules 316', and table 318', the respective components used by server computer 302 (i.e., program component 314, selection rules 316, and table 318), may be updated more frequently than the respective local copies used by client device 322 in case of a server outage.

Figure 4:
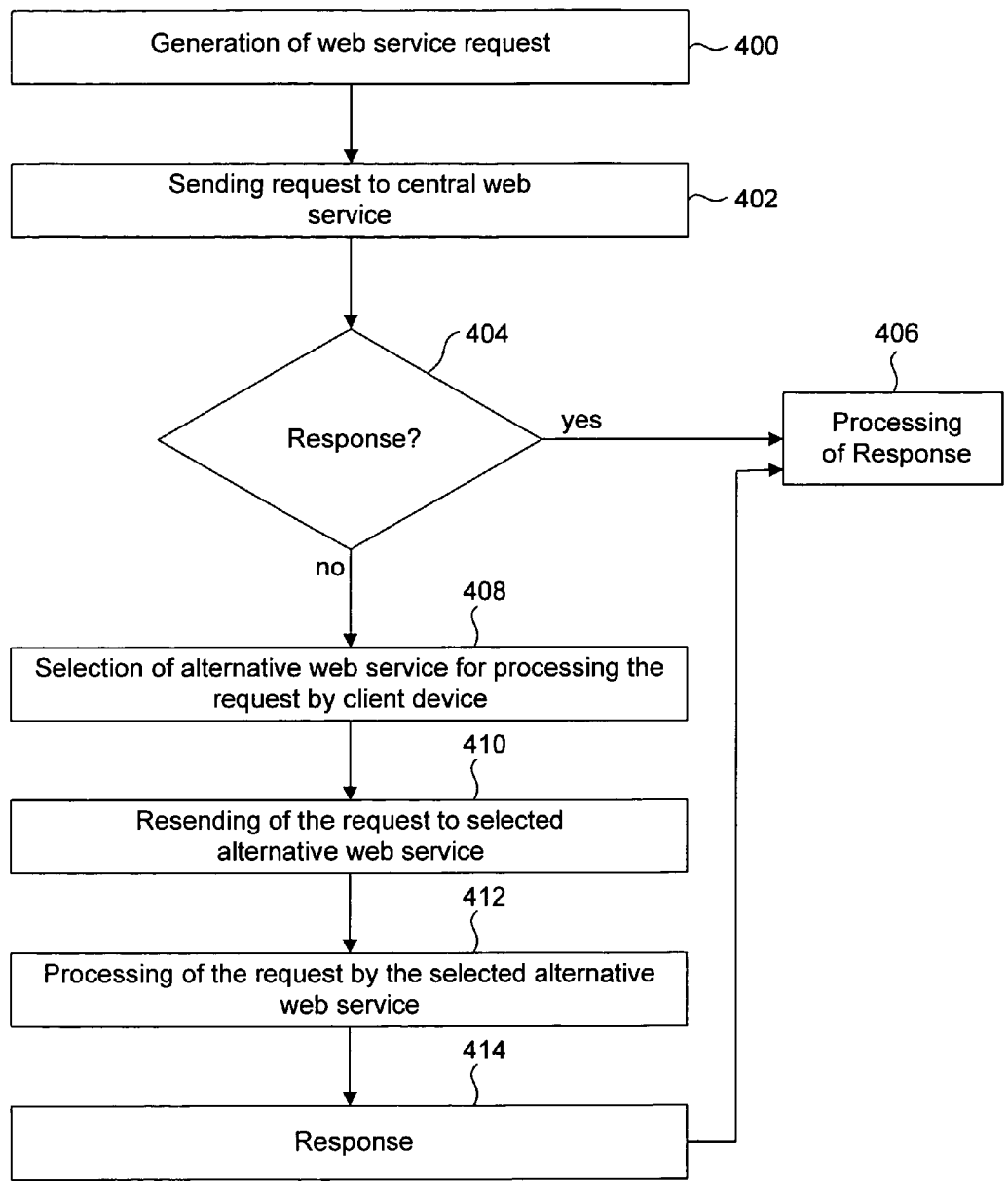
FIG. 4 is a flowchart of an exemplary method, consistent with an embodiment of the present invention.

FIG. 4 is a flowchart of an exemplary method, consistent with an embodiment of the present invention. In step 400, a web service request is generated by the client device. In step 402, the web service request is sent to the central web service. In step 404, the client device checks whether a response to the web service request has been received within a predefined time limit. If the response has been received, the response is processed in step 406. If the response has not been received, the process goes to step 408 for local selection of one of the alternative web services by the client device itself using a local copy of the respective selection logic.

In step 410, the web service request generated in step 400 is resent to the alternative web service selected in step 408. In step 412, the selected web service processes the web service request. In step 414, a web service response is provided to the requesting client device. Next, the process goes to step 406 for further processing of the response by the client device.

Figure 5:
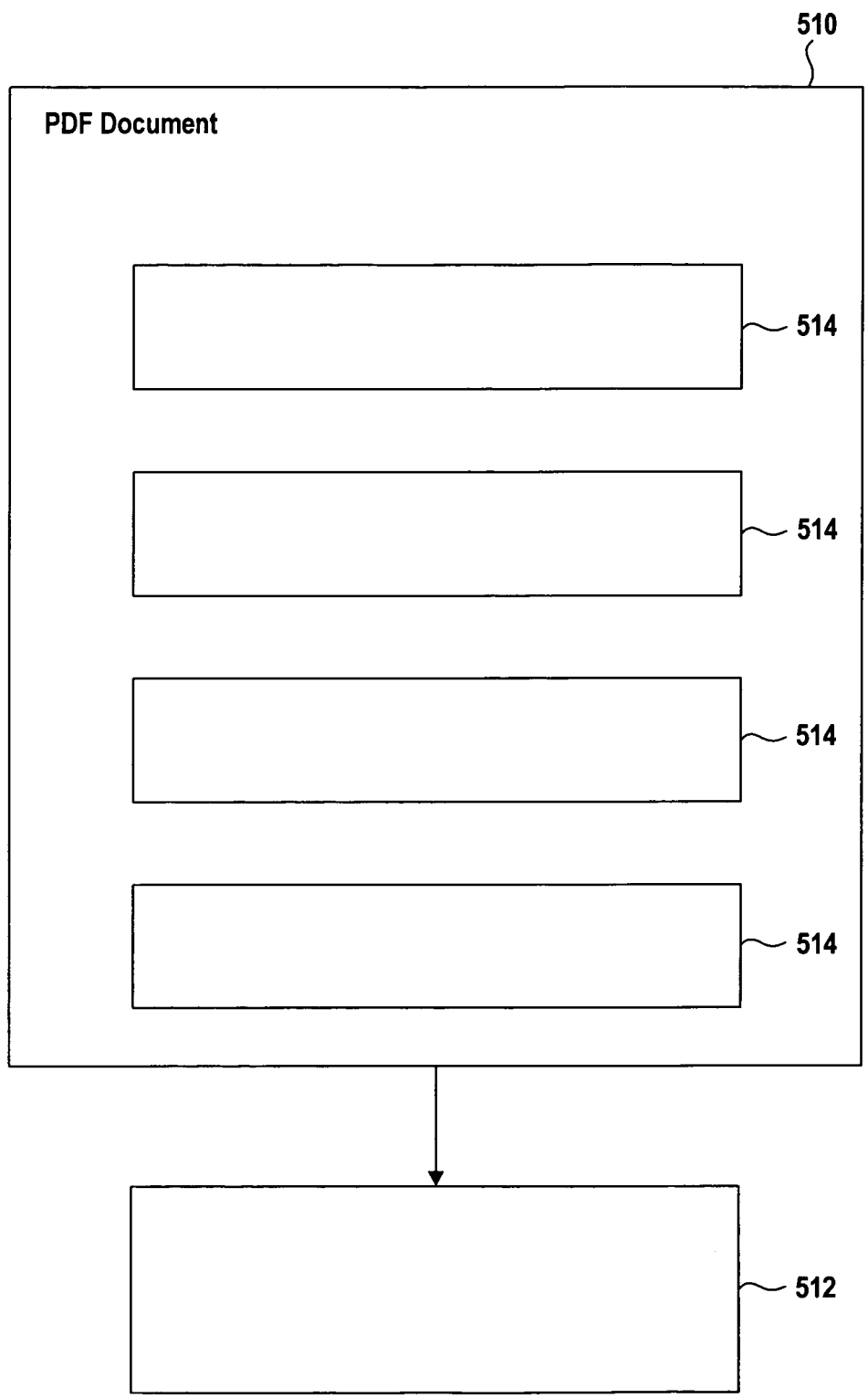
FIG. 5 is a block diagram of an exemplary embedded mark-up language document that can be used for initiating a web service request, consistent with an embodiment of the present invention.

FIG. 5 is a block diagram of an exemplary embedded mark-up language document 510 that can be used for entering user data to be included in the web service request (such as web service 112 in FIG. 1 or web service request 312 in FIG. 3), consistent with an embodiment of the present invention. The application program of the client device may use embedded mark-up language document 510 for the entry of user data.

In one embodiment, embedded mark-up language document 510 is an embedded XML document that has embedded XML data 512.

For example, embedded mark-up language document 510 may be an electronic data entry form that has data entry fields 514 for user data. Each data entry field 514 may have an associated explanatory text that explains the user data to which the respective data entry field relates. In some implementations, at least some of data entry fields 514 are compulsory data entry fields; some of data entry fields 514 may be optional and may be left open at the user's option.

Figure 6:
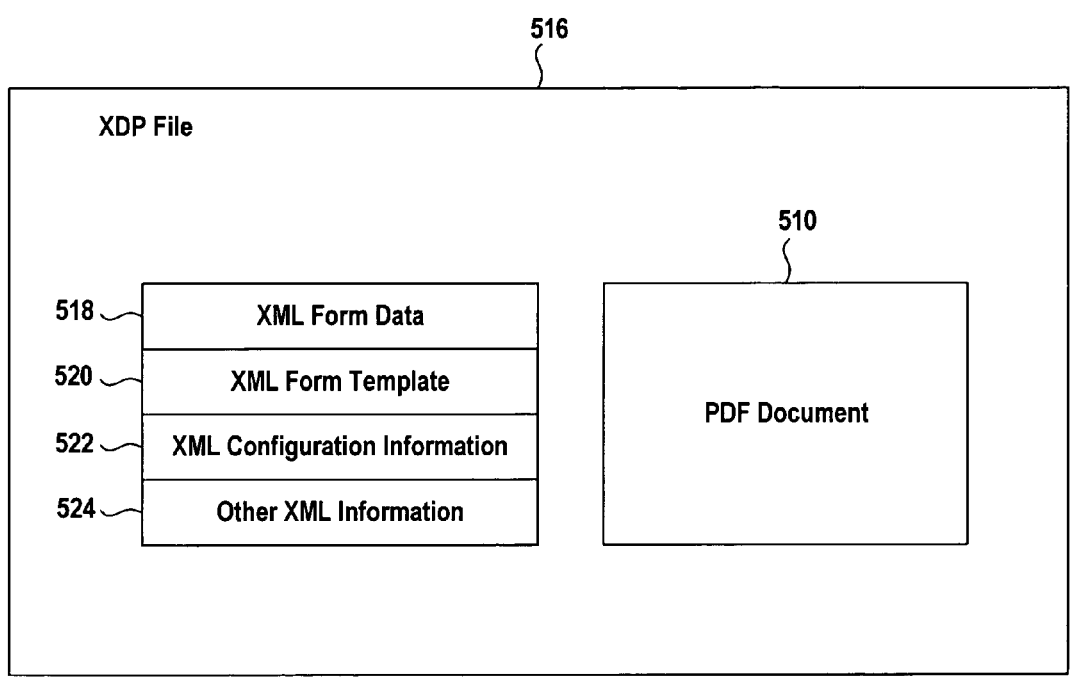
FIG. 6 is a block diagram of the exemplary embedded mark-up language document of FIG. 5 after its conversion to a mark-up language data package, consistent with an embodiment of the present invention.

FIG. 6 is a block diagram of the exemplary embedded mark-up language document 510 of FIG. 5 after its conversion to an XML data package (XDP) file 516, consistent with an embodiment of the present invention. XDP file 516 may include data entry fields 514, the textual information, and the graphics, if any, of embedded mark-up language document 510 in encoded form.

In addition, XDP file 516 may include XML form data 518. XML form data 518 may store the user data that has been entered into data entry fields 514. The user data can be encoded in XML form data 518 according to an arbitrary XML schema chosen by the developer of embedded mark-up language document 510 during the design phase. The schema can be an industry standard, an enterprise standard, or completely customized. Some examples of industry-standard schemas are ACORD (insurance), XBRL (finance), HL7 (healthcare), and SF424 (eGovernment).

XML form template 520 of XDP file 516 contains the mapping of XML form data 518 to data entry fields 514 as well as the logic that controls the interactive behavior of embedded mark-up language document 510, such as calculations and data validations.

XML configuration information 522 of XDP file 516 is a global reference for database and web services SOAP connections. XML configuration information 522 is used by XML form template 520 as such a global reference. Further, XDP file 516 can contain other XML information 524. Other XML information 524 can include customer XML information such as a schema file to facilitate validation, XML digital signatures, content meta data to facilitate archiving, or data used by a custom digital document application.

XDP file 516 is an XML file, so XML tools, XML system interfaces, and web services can work directly with it. Also, the XML data is directly accessible by such tools and interfaces. Further, embedded mark-up language document 510 (e.g., PDF document), can provide all the traditional PDF benefits of precision document layout and high-fidelity printing by embedding the PDF in an XML element (i.e., XDP file 516).

The PDF representation of embedded mark-up language document 510 may be used when the document is packaged with supplementary data or images. The XDP representation may be chosen when the document and user data must travel in XML work flows, the user data needs to be manipulated with XML tools, or when it needs to be stored in an XML repository, for example.

In one embodiment, the Adobe XML architecture is used for embedded mark-up language document 510, XDP file 516, and for the conversion between these two representations. The Adobe XML architecture provides an object-oriented approach to map user XML form data and data from dynamic sources to particular data entry fields in the form layout.

However, the present invention is not restricted to the Adobe XML architecture and may use for other mark-up languages and respective embedded mark-up language documents, such as extensible mark-up languages.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations, and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A client device comprising:
   means for storing a central web service address of a server computer providing a central web service;
   wherein the means for storing the central web service address further comprises an application program that:
      contains the central web service address, and
      implements an industrial control functionality;
   means for generating location information;
   means for generating a web service request, wherein the web service request comprises additional information, the additional information comprising: location information, user-group identifying information, and tax information, for use in selecting one of a plurality of alternative web services,
   wherein the application program uses an embedded markup language document for entry of user data for the web service request;
   interface means for sending the web service request to a central web service address and for receiving a web service response from the selected one of a plurality of alternative web services;
   wherein each of the plurality of alternative web services is assigned to one or more groups comprising a geographically-oriented group, a user-oriented group, and a tax-oriented group prior to the selected web service being selected by the central web service, the assignments being made by associations created in one or more memories accessible to the central web service, between each of the plurality of alternative web services and the one or more groups, and
   wherein the selected alternative web service is selected by the central web service, based on a predefined selection criterion that uses the additional information of the web service request to identify at least one of the one or more groups;
   timer means for application of a time-out criterion, for determining if the central web service is unavailable; and
   means for selecting the selected one of the plurality of alternative web services using a local copy of a selection table, if the central web service is unavailable,
   wherein the interface means is adapted to re-send the web service request to the selected one of the plurality of web services, if the central web service is unavailable, and wherein the means for selecting the selected one of the plurality of web services is adapted to update the local copy of the selection table by storing a copy of a selection table stored on the server computer that provides the central web service.

2. The client device of claim 1, wherein the central web service selects the selected one of the plurality of alternative web services by applying a load-balancing rule.

3. The client device of claim 2, wherein the central web service applies the load-balancing rule to equalize an average number of web service requests to be processed per alternative web service.

4. A data processing method comprising:
   storing, on a client device, a central web service address of a server computer providing a central web service;
   storing, on a client device, an application program that:
      contains the central web service address, and
      implements an industrial control functionality;
   generating location information;
   generating a web service request by the client device, wherein the web service request comprises additional information, the additional information comprising: location information, user-group identifying information, and tax information, for use in selecting one of a plurality of alternative web services;
   wherein the application program uses an embedded markup language document for entry of user data for the web service request;
   sending the web service request from the client device to the central web service address;
   receiving a web service response from the selected one of a plurality of alternative web services,
   wherein each of the plurality of alternative web services is assigned to one or more groups comprising a geographically-oriented group, a user-oriented group, and a tax-oriented group prior to the selected web service being selected by the central web service, the assignments being made by associations created in one or more memories accessible to the central web service, between each of the plurality of alternative web services and the one or more groups, and
   wherein the selected alternative web service is selected by the central web service, based on a predefined selection criterion that uses the additional information of the web service request to identify at least one of the one or more groups;

determining if the central web service is unavailable, using a time-out criterion, and, if the central web service is unavailable, selecting the selected one of the plurality of alternative web services from a local copy of a selection table, and resending the web service request to the selected one of the plurality of web services; and updating the local copy of the selection table by storing a copy of a selection table stored on the server computer that provides the central web service.

5. The method of claim 4, wherein the predefined selection criterion is a load-balancing criterion to balance an average number of web service requests to be processed per alternative web service.

6. A client device comprising:

means for storing the central web service address;

means for generating location information;

wherein the means for storing the central web service address further comprises an application program that:
contains the central web service address, and
implements an industrial control functionality;

means for generating a web service request, wherein the web service request comprises additional information, the additional information comprising: location information, user-group identifying information, and tax information, for use in selecting one of a plurality of alternative web services;

wherein the application program uses an embedded markup language document for entry of user data for the web service request;

interface means for sending the web service request to a central web service address of a server computer providing a central web service, and for receiving a web service response from the selected one of a plurality of alternative web services selected by the central web service, wherein each of the plurality of alternative web services is assigned to one or more groups comprising a geographically-oriented group, a user-oriented group, and a tax-oriented group prior to the selected web service being selected by the central web service, the assignments being made by associations created in one or more memories accessible to the central web service, between each of the plurality of alternative web services and the one or more groups, and wherein the selected alternative web service is selected by using the additional information of the web service request to identify at least one of the one or more groups;

timer means for application of a time-out criterion, for determining if the central web service is unavailable; and means for selecting the one of the plurality of web services using a local copy of a selection table, if the central web service is unavailable, wherein the interface means is adapted to re-send the web service request to the selected one of the plurality of alternative web services if the central web service is unavailable, and wherein the means for selecting the one of the plurality of web services is adapted to update the local copy of the selection table by storing a copy of a selection table stored on the server computer that provides the central web service.

7. The client device of claim 6, wherein the client device is a car-navigation system.

8. A computer-readable non-transitory storage medium comprising programmable instructions adapted to perform a method of data processing, the method comprising:

storing, on a client device, a central web service address of a server computer providing a central web service;

wherein the client device further comprises an application program that:
contains the central web service address, and
implements an industrial control functionality;

generating location information;

generating a web service request by the client device, wherein the web service request comprises additional information, the additional information comprising: location information, user-group identifying information, and tax information, for use in selecting one of a plurality of alternative web services;

wherein the application program uses an embedded markup language document for entry of user data for the web service request;

sending a web service request from the client device to the central web service address;

receiving a web service response from the selected one of a plurality of alternative web services, wherein each of the plurality of alternative web services is assigned to one or more groups comprising a geographically-oriented group, a user-oriented group, and a tax-oriented group prior to the selected web service being selected by the central web service, the assignments being made by associations created in one or more memories accessible to the central web service, between each of the plurality of alternative web services and the one or more groups, and wherein the selected alternative web service is selected by the central web service, based on a predefined selection criterion that uses the additional information of the web service request to identify at least one of the one or more groups;

determining if the central web service is unavailable, using a time-out criterion, and, if the central web service is unavailable, selecting the one of the plurality of alternative web services from a local copy of a selection table, and resending the web service request to the selected one of the plurality of web services; and updating the local copy of the selection table by storing a copy of a selection table stored on the server computer that provides the central web service.

9. A data processing system comprising a server computer and the client device of claim 1, the interface means of the client device being a first interface means, the server computer comprising:

means for providing the central web service, the central web service having the central web service address;
second interface means for receiving the web service request from the client device and for forwarding the web service request to one of a plurality of alternative web services based on the predefined selection criterion; and
means for storing the selection table.

* * * * *